United States Patent
Bongartz et al.

(10) Patent No.: US 7,008,325 B2
(45) Date of Patent: Mar. 7, 2006

(54) RETAINER RING FOR TRIPOD CONSTANT VELOCITY JOINTS

(75) Inventors: Peter Bongartz, Sankt Augustin (DE); Bradley W. Doner, Northville, MI (US); Michael W. Hopson, Clinton Township, MI (US); Robert W. Sams, Clinton Township, MI (US)

(73) Assignee: Automotive Components Holdings, Inc., Dearborn, MI (US)

( * ) Notice: Subject to any disclaimer, the term of this patent is extended or adjusted under 35 U.S.C. 154(b) by 0 days.

(21) Appl. No.: 10/680,923

(22) Filed: Oct. 8, 2003

(65) Prior Publication Data

US 2005/0079916 A1  Apr. 14, 2005

(51) Int. Cl.
 *F16D 3/205* (2006.01)
(52) U.S. Cl. ...................... 464/111; 411/517
(58) Field of Classification Search ............... 464/111, 464/130, 905; 411/353, 517, 519; 384/539, 384/561; 24/910
 See application file for complete search history.

(56) References Cited

U.S. PATENT DOCUMENTS

| | | | | |
|---|---|---|---|---|
| 2,368,175 A | * | 1/1945 | Thomas | 384/561 |
| 2,648,578 A | * | 8/1953 | Stearns et al. | |
| 2,888,852 A | * | 6/1959 | Conner | 411/517 |
| 3,417,650 A | * | 12/1968 | Varrin | 411/517 |
| 4,224,806 A | | 9/1980 | Kobayashi | |
| 4,270,815 A | * | 6/1981 | Olschewski et al. | 384/561 |
| 4,317,602 A | * | 3/1982 | Orain | 384/561 |
| 4,558,962 A | | 12/1985 | Meinlschmidt | |
| 4,693,698 A | * | 9/1987 | Olson, II | 464/111 |
| 4,818,166 A | | 4/1989 | Szukay et al. | |
| 4,995,736 A | | 2/1991 | Haase et al. | |
| 5,496,142 A | | 3/1996 | Fodor et al. | |
| 5,525,109 A | * | 6/1996 | Hofmann et al. | 464/111 |
| 5,591,085 A | | 1/1997 | Stall et al. | |
| 5,816,627 A | * | 10/1998 | Readman | 411/353 X |
| 5,915,875 A | | 6/1999 | Bodtker | |
| 6,168,529 B1 | | 1/2001 | Moulinet | |
| 6,190,260 B1 | | 2/2001 | Flores et al. | |
| 6,390,926 B1 | | 5/2002 | Perrow | |
| 6,412,985 B1 | * | 7/2002 | Schweitzer et al. | 384/561 X |
| 2003/0078108 A1 | | 4/2003 | Turbant et al. | 464/111 |

FOREIGN PATENT DOCUMENTS

EP  1 219 845 A2  7/2002
WO  WO 98/27348  6/1998

* cited by examiner

*Primary Examiner*—Greg Binda

(57) ABSTRACT

A constant velocity (CV) joint and, more particularly, a retaining ring for a CV joint and a method of assembling a retaining ring on a CV joint. The tripod constant velocity joint may be assembled by placing a retaining ring in alignment with a trunnion head, applying a force to the aligned retaining ring to expand the diameter of said retaining ring so that a fracture area on the retaining ring fractures. After the fracture area fractures, the retaining ring is displaced into a retaining groove on the trunnion. The retaining ring includes an outer surface, an inner surface, a first notch extending from one of the inner and outer surfaces to the other of the inner and outer surfaces, and a fracture area extending from the first notch to the other of the inner and outer surfaces.

2 Claims, 5 Drawing Sheets

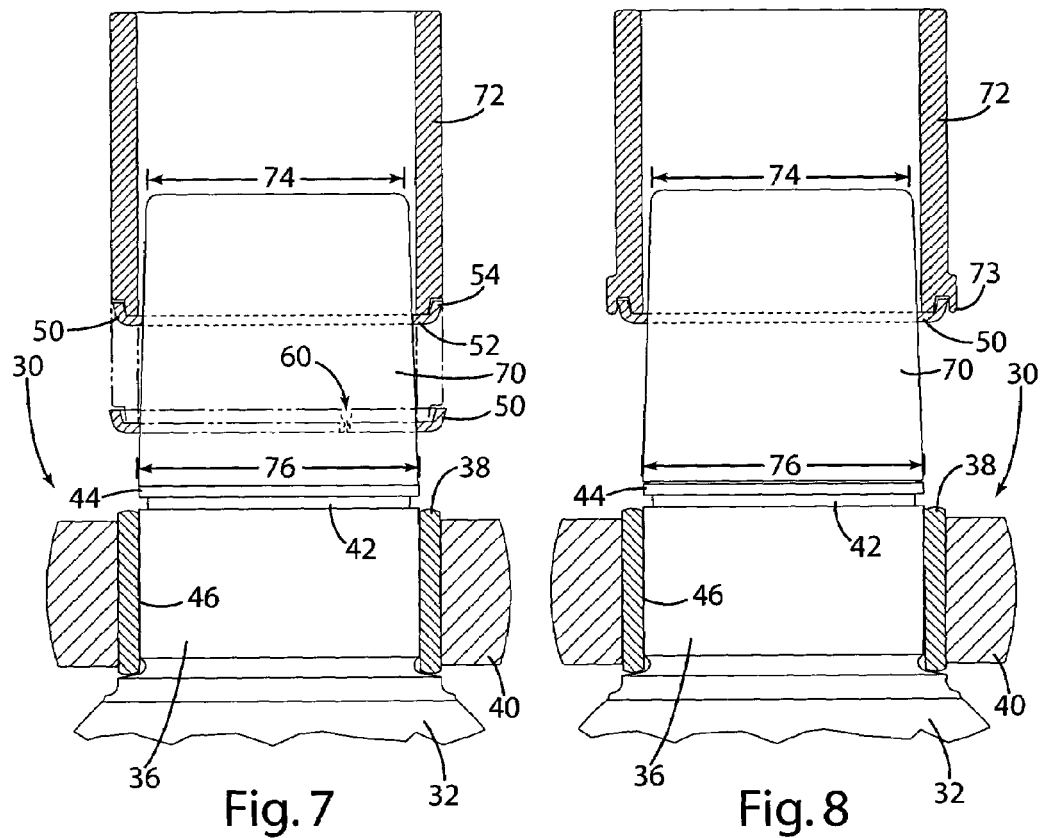
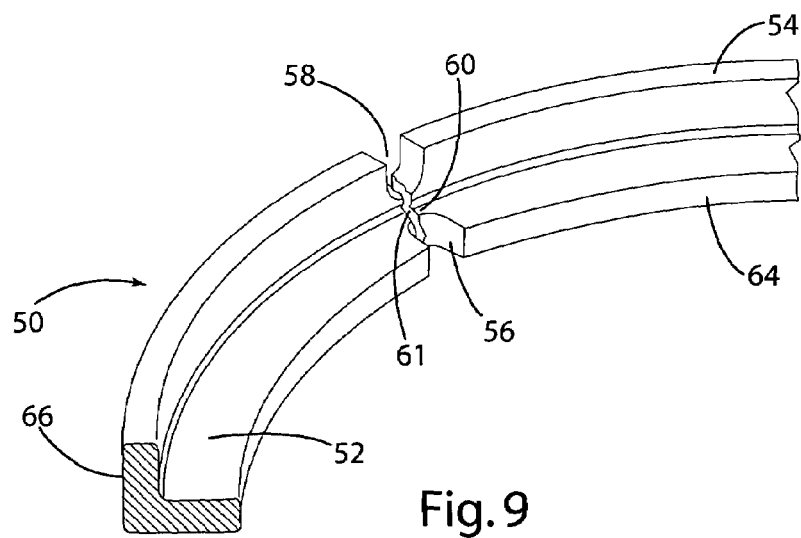

RETAINER RING FOR TRIPOD CONSTANT VELOCITY JOINTS

BACKGROUND OF THE INVENTION

The present invention relates to constant velocity (CV) joints and, more particularly, to a retaining ring for CV joints and a method of assembling a retaining ring on a CV joint.

Tripod constant velocity joints are well known in the art and generally include a housing defining a plurality of elongated drive channels and a spider assembly retained within the housing. The spider assembly includes drive rollers disposed in the drive channels, allowing relative longitudinal movement between the spider assembly and the housing. The longitudinal movement between the spider assembly and housing allows the CV joint to accommodate changes in distance during normal vehicle suspension movement.

To assemble the drive rollers 40' onto the spider assembly 30', typically both an annular retainer 12 and snap clip 14 are used, as illustrated in FIG. 1. The annular retainer 12 is typically formed with an inside diameter slightly greater than the diameter of trunnion 36', so that the annular retainer 12 may be slipped over the trunnion head 44' and secured on the trunnion 36' with the snap clip 14. The annular retainer in turn secures the needle bearings 38' and drive rollers 40' on the trunnion 36'. The secured snap clip 14 fits partially within the retaining groove 42 on the trunnion 36'. The snap clip 14 is typically a coiled wire forming a broken circle which expands as it is forced over the trunnion head 44' and into the retaining groove 42. Therefore, the height of the trunnion 36' is set by combining the space needed on the trunnion 36' to support the needle bearings 38', annular retainer 12, and snap clip 14 as well as the trunnion head 44'. As it is increasingly desirable to reduce both the weight and size of vehicle components for greater flexibility in packaging as well as improve fuel economy, it is desirable to reduce the size of each component without detracting from durability. It is also desirable to reduce the number of components to be assembled.

SUMMARY OF THE INVENTION

The present invention relates to constant velocity (CV) joints and, more particularly, to a retaining ring for CV joints and a method of assembling a retaining ring on a CV joint.

The tripod constant velocity joint is assembled by placing a retaining ring in alignment with a trunnion head, applying a force to the aligned retaining ring to expand the diameter of said retaining ring so that a fracture area on the retaining ring fractures, and displacing the retaining ring into a retaining groove after fracturing said fracture area. By fracturing the retaining ring during assembly, the retaining ring may replace both the annular retainer and snap clip typically used on tripod CV joints. A single retaining ring requires less space than the combined space required by the snap clip and annular retainer thereby allowing the height of the trunnion to be reduced. Any reduction in the height of the trunnion also allows the spider assembly and housing to be reduced in size, thereby reducing weight of the CV joint and improving packaging to allow increased space for other components.

The retaining ring includes an outer surface, an inner surface, a first notch extending from one of the inner and outer surfaces to the other of the inner and outer surfaces, and a fracture area extending from the first notch to the other of the inner and outer surfaces.

The present invention is also directed to a constant velocity joint including a trunnion defining a retaining groove and a retaining ring secured with the retaining groove wherein the retaining ring includes a fracture area that is fractured as the retaining ring is secured within the retaining groove on the trunnion. The retaining ring may further include a first leg having an inner surface, a second leg having an outer surface, and a first notch defined by one of the first and second legs.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 7 is a sectional view of the retainer ring being assembled onto the trunnion with the retainer ring shown in phantom lines after the fracture area is fractured;

FIG. 8 is a sectional view of the retainer ring being assembled onto the trunnion using an alternative pressure tool; and FIG. 9 is an enlarged perspective view of the retainer ring notch showing the fracture after assembly.

DETAILED DESCRIPTION OF THE PREFERRED EMBODIMENT

Figure 2:
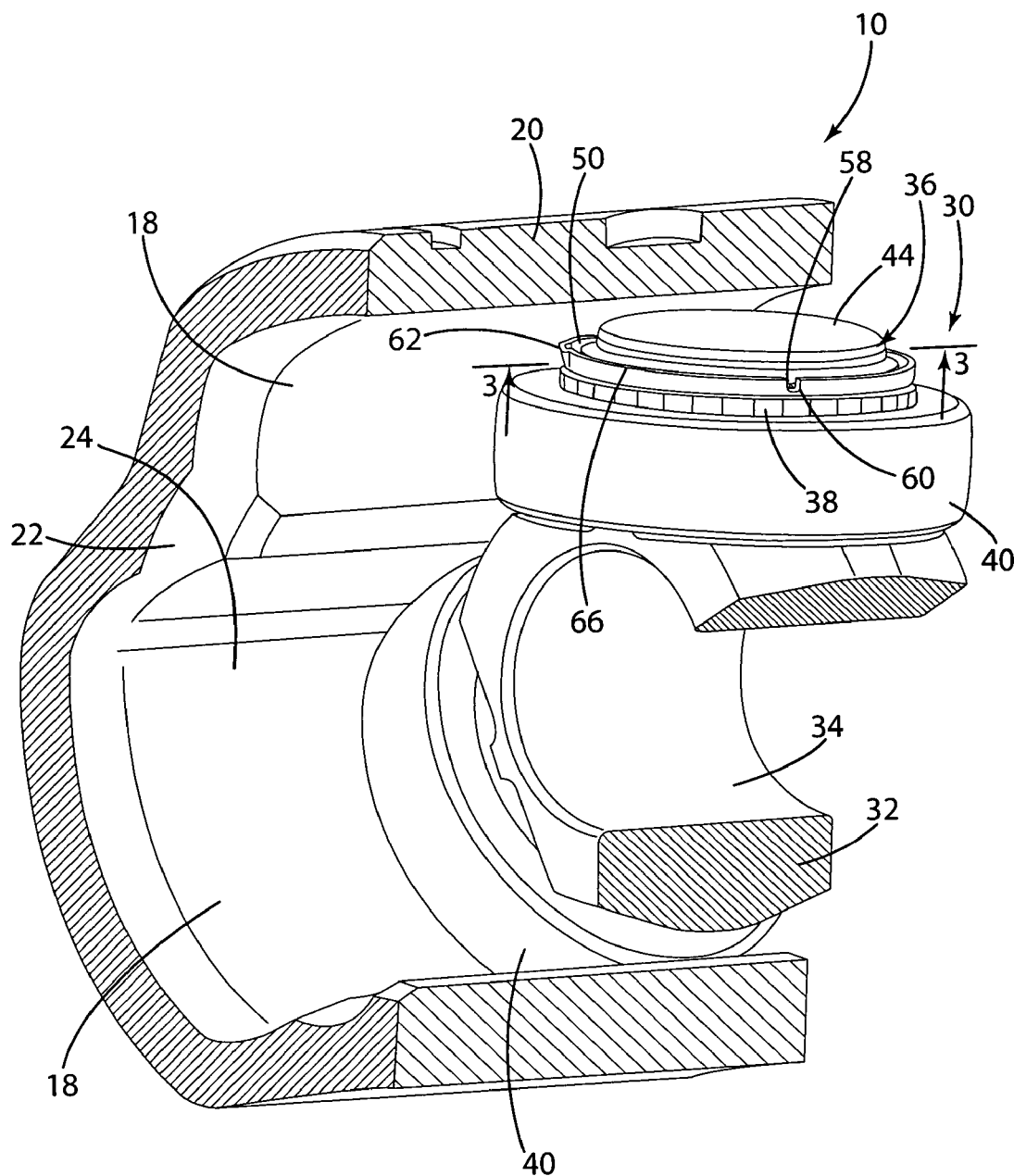
FIG. 2 is a perspective sectional view of a tripod CV joint incorporating the present invention.

A CV joint 10 including a retaining ring 50 constructed in accordance with the illustrated embodiment is shown in FIG. 2. The CV joint 10 includes a generally cylindrical housing 20 and a spider assembly 30. The spider assembly 30 includes drive rollers 40 and trunnions 36. The drive rollers 40 are secured by the retaining ring 50 on the trunnions 36, which allows relative longitudinal movement between the housing 20 and spider assembly 30 to accommodate suspension movement. Although not illustrated, the housing 20 is generally open at its outer end and closed at its inboard end wherein the inboard end is attached to a first drive shaft (not shown) extending axially therefrom. The spider assembly 30 is also coupled to a second drive shaft (not shown) by a central bore 34, allowing the CV joint 10 to transfer torque between the shafts while also being able to change the axial length of the CV joint.

As is shown in FIG. 7 and further described herein, the retaining ring 50 is assembled on the trunnion by placing an unbroken retaining ring in alignment with the trunnion 36. A force directed toward the trunnion 36 is applied to the retaining ring 50, so that the retaining ring 50 fractures. The fractured retaining ring 50 may then expand to pass onto the trunnion 36 which has an outside diameter generally greater than that of the inside diameter of the retaining ring.

The housing 20 generally includes circumferentially spaced and longitudinally extending drive channels 24 formed on the interior wall 18 of the housing. The drive channels 24 are typically concentric about the inner wall 18 of the housing and are bounded by concave side walls 22.

The spider assembly 30 includes a hub 32 from which the trunnions 36 extend radially. The hub 32 defines the central bore 34 for receiving a shaft, as is well known in the art. The drive rollers 40 are mounted on the trunnions 36 and fit within the drive channels 24 when the CV joint 10 is assembled. Typically the drive rollers 40 are mounted on the trunnions 36 with needle bearings 38 interposed between the drive rollers and the trunnions. The needle bearings 38 allow the drive rollers 40 to rotate freely about the trunnions 36.

Figure 1:
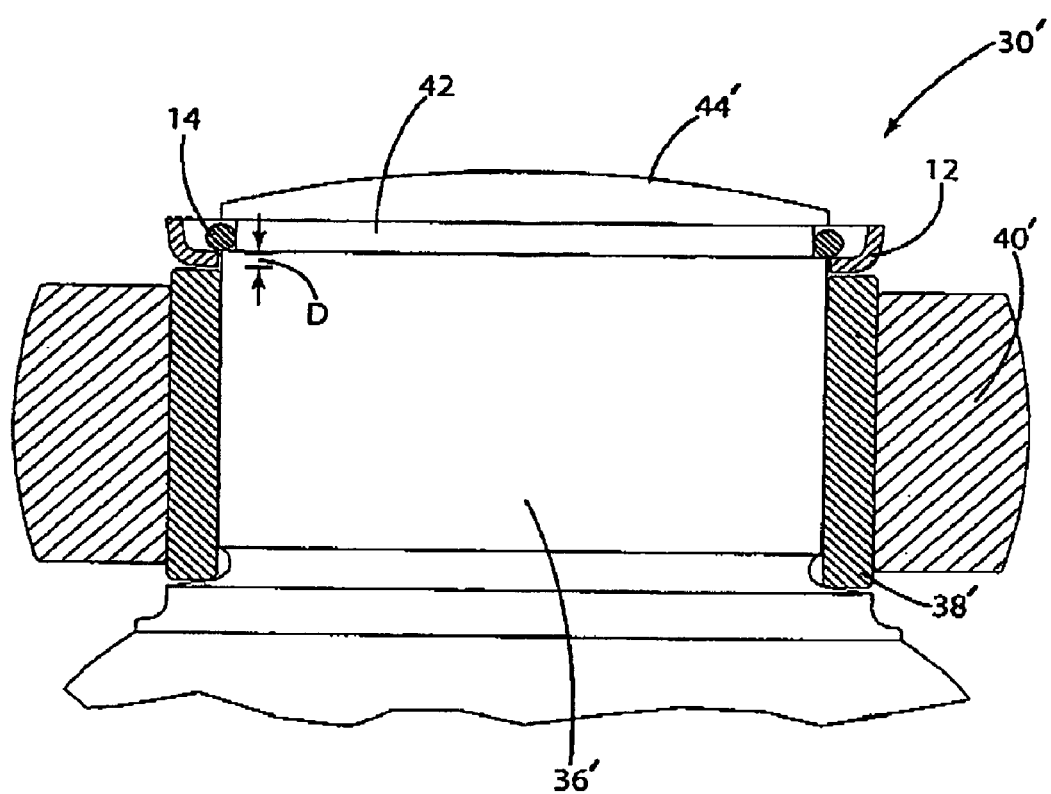
FIG. 1 is a partial sectional view of a prior art spider assembly.
Figure 3:
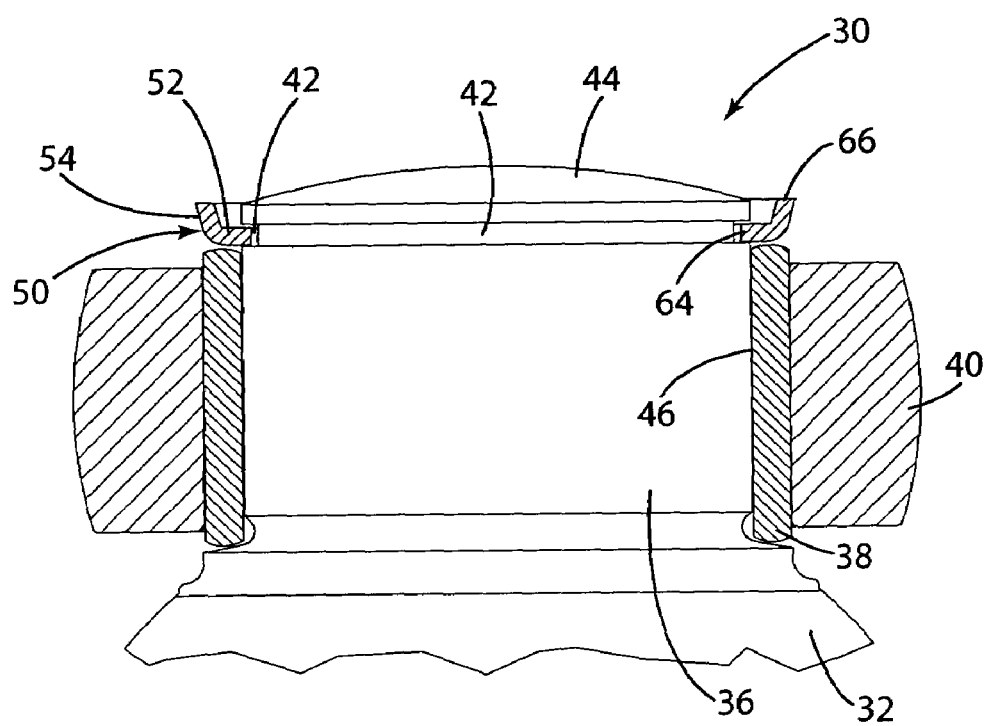
FIG. 3 is a sectional view along line 3—3 in FIG. 2.

The trunnions 36 include an outer cylindrical surface 46, a retaining groove 42, and a trunnion head 44 (FIG. 3). The retaining groove 42 is located above where the needle bearings 38 engage the outer cylindrical surface 46 and receives the fractured retaining ring 50, which secures the drive roller 40 and needle bearings 38 on the associated trunnion 36. In the present invention, the retaining groove 42 may have a height less than typically used in the prior art to retain the snap clip 14, as illustrated in FIGS. 1 and 3, because the flat surfaces of the retaining ring 50 may fit within a smaller retaining groove than a snap clip 14. Further, the distance D, in FIG. 1, is no longer needed because the retaining ring 50 is secured within the retaining groove 42, acting as both the annular retainer 12 and the snap clip 14. This reduction in the height of the trunnion 36 allows the spider assembly 30 and housing 20 to be reduced in size, thereby reducing weight and improving packaging to allow greater space for other components. Further, the housing 20 may be reduced a comparable amount thereby reducing size and weight of the CV joint 10.

The retaining ring 50 includes a first leg 52 defining an inner surface 64, and a second leg 54 extending from the first leg and defining an outer surface 66. A fracture area 60 (FIG. 4) extends between the inner and outer surfaces 64 and 66. The fracture area 60 fractures during assembly and generally is a weakened area on the retaining ring. More specifically, the first leg 52 defines a first notch 56 extending from the inner surface 64 and the second leg 54 defines a second notch 58 extending from the outer surface 66 with the fracture area 60 extending between the notches 56, 58. It should be readily recognizable to one skilled in the art that the retaining ring 50 may be formed with only one notch 56, 58 from which the fracture area 60 extends to the opposing surface. For example, the first notch 56 may be formed on the first leg 52 with the fracture area 60 extending between the first notch and the outer surface 66. The retaining ring 50 may also be formed without notches, with the fracture area being a groove (not shown) across the surface of the legs 52, 54 or any other weakened area to allow the retaining ring to fracture in a controlled manner during assembly. As illustrated in the drawings, the first leg 52 is angled relative to the second leg 54 to provide a suitable surface to be gripped during assembly and to provide increased durability. The second leg 54 may also include retention members 62 to retain of the drive rollers 40 on the trunnion during assembly.

Figure 6:
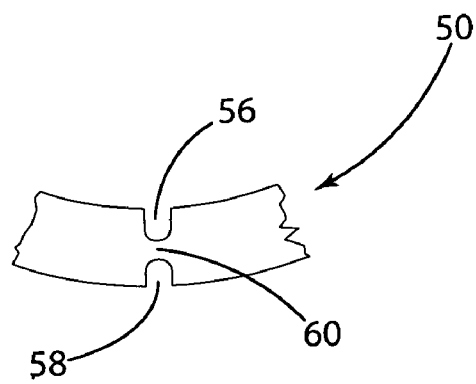
FIG. 6 is an enlarged partial view of the retainer ring showing the notches before the legs are angled relative to each other during the manufacturing process.

A method of forming the retaining ring 50 and the method of assembling the CV joint 10 will be described. The retaining ring 50 may be formed through a variety of techniques. In the illustrated embodiment, the retaining ring 50 is formed from an unbroken planar ring, a portion of which is illustrated in FIG. 6. The planar ring may be formed by stamping, die cutting, fine blanking, machining, or any other suitable technique. To define the fracture area 60, the notches 56, 58 are added as shown in FIG. 6. The notches 56, 58 may be formed during the forming of the retaining ring 50, such as by stamping, die cutting, or by cutting a longitudinal groove along the surface of the cylindrical metal stock before slicing individual retaining rings 50 from a cylindrical tube. Of course, the notches may be added after the planer ring is formed.

After the formation of the notches 56, 58, the retaining ring 50 may be formed in its final shape. It should be readily recognizable to one skilled in the art that the retaining ring 50 may be formed in any number of shapes and assembled on the trunnion. The outer surface 66 is generally offset from its planar position with the inner surface 64 by angling the second leg 54 relative to the first leg 52. The formation of the notches 56, 58 and angling of the legs 52, 54 may all be performed in a single step as the retaining ring 50 is formed. The retention members 62 may also be formed on the second leg 54 as the legs 52, 54 are angled to ensure that the drive roller 40 stays on the trunnions 36 while being assembled.

After the retaining ring 50 is formed to its final shape, it may be heat-treated to provide greater durability and to ensure its continued retention within the retaining groove 42. The unbroken retaining ring prevents warping, twisting or offsetting of the ends during heat treatment. Preventing warping or twisting of the retaining ring 50 ensures that the retaining ring 50 stays secured within the retaining groove 42 after assembly onto the trunnion 36.

The CV joint is generally assembled in a conventional manner, except for the assembly of the retaining ring 50 on the trunnion 36. In general, the retaining ring 50 is forced onto the trunnion 36. The trunnion 36 has a diameter greater than the inside diameter 68 of the retaining ring 50 so that as the retaining ring is displaced into the retaining groove 42, the fracture area 60 fractures, allowing the retaining ring to expand. When the ring is displaced into alignment with the groove 42, the resilient force of ring deformation causes the ring to snap back and seat within the retaining groove 42. More specifically, the retaining ring 50 is aligned with the trunnion head 44. The trunnion head 44 may have a domed or conical shape, as illustrated in FIG. 3, to facilitate the fracture of the ring 50 as it is forced over the expanding diameter of the trunnion head 44 toward the hub 32. The fractured retaining ring 50 then expands in diameter to slip over the trunnion head 44 and contracts in diameter upon being received within the retaining groove 42. An exemplary fracture 61 is illustrated in FIG. 9.

A fracturing tool 70 as illustrated in FIGS. 7 and 8 may be used to further facilitate assembly. The fracturing tool 70 has a somewhat frusto conical shape with a minimum diameter 74 and a maximum diameter 76. The maximum diameter 76 is placed closest to the trunnion head 44 as illustrated in FIGS. 7 and 8. The end with the maximum diameter may be hollowed out to receive the trunnion head 44. If the fracturing tool is used, the retaining ring 50 is aligned with the fracturing tool 70 and trunnion head 44 so that the fracturing tool becomes disposed within the inside diameter 68 of the retaining ring 50. The ring 50 is then forced toward the maximum diameter of the fracturing tool. Due to the conical shape of the fracturing tool 70, the inside diameter 68 of the retaining ring is generally smaller than the maximum diameter 76 of the fracturing tool 70, so that as the retaining ring 50 is forced toward the maximum diameter 76, the fracture area 60 fractures, allowing the retaining ring 50 to expand, pass over the maximum diameter onto the trunnion head 44, and into the retaining groove 42. The fracturing tool 70 with the gradual increase in diameter may achieve a more controlled fracture, reduce the applied force needed to fracture the fracture area, and prevent deformation of the retaining ring 50 as it fractures.

A pressure tool 72, as illustrated in FIG. 7, may be used to apply a force to the retaining ring 50. An alternative embodiment of the pressure tool 72 may be seen in FIG. 8, wherein the pressure tool includes an outer lip 73, preventing the retaining ring from expanding beyond a certain diameter. If the retaining ring 50 expands too far when the fracture area 60 fractures, the metal retaining ring may not be able to contract sufficiently to stay secured within the retaining groove 42.

Figure 4:
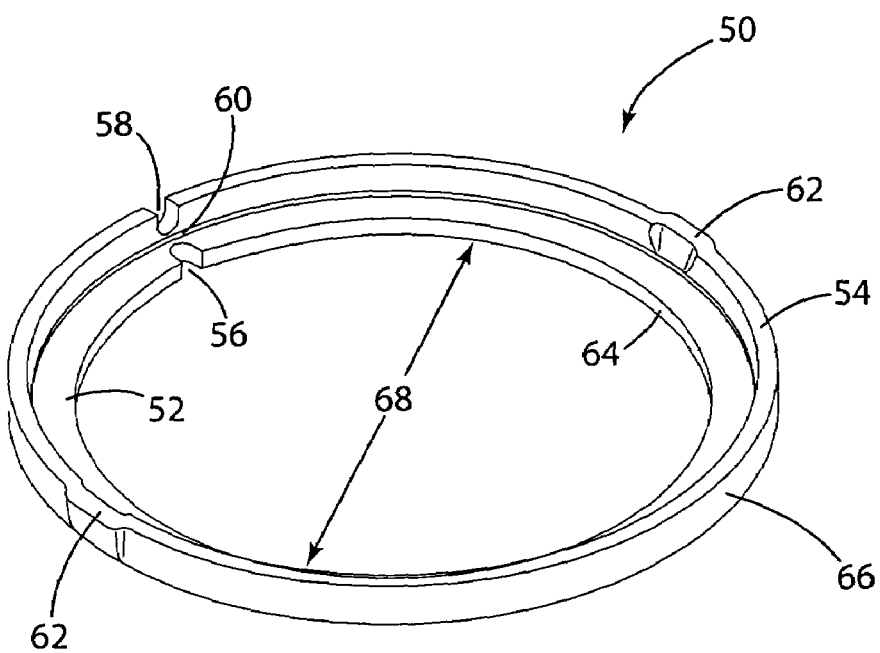
FIG. 4 is a perspective view of the retainer ring.
Figure 5:
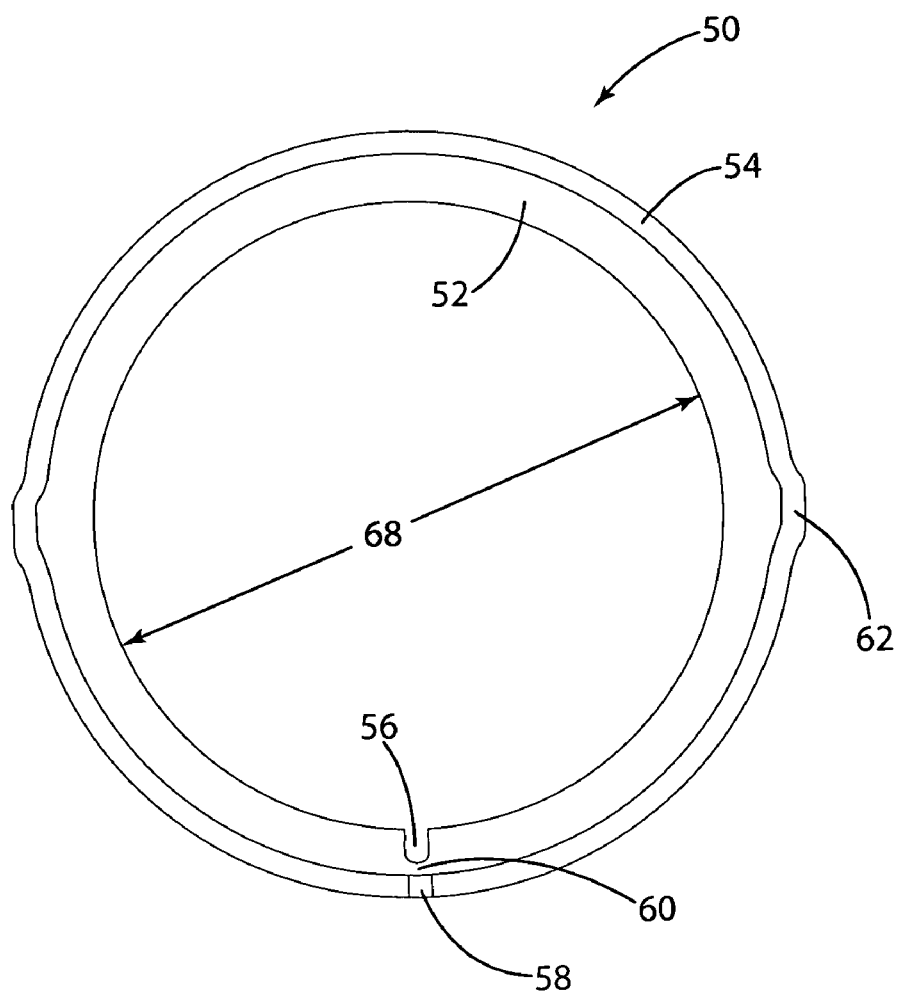
FIG. 5 is a top plan view of the retainer ring.

The retaining ring 50 generally includes the fracture area 60 that fractures during assembly onto the trunnion 36 to secure the drive rollers 40 and needle bearings 38. The fracture area 60 may be any weakened area on the retaining ring 50 that may fracture in a controlled consistent manner. As illustrated in FIGS. 4–6, the fracture area 60 may be between two notches 56, 58. In comparison to a typical split ring used to secure items, the unbroken shape of the retaining ring 50 allows the retaining ring to be heat treated while minimizing deformation, warping, and twisting. The retaining ring 50 is generally assembled onto the trunnion and into the retaining groove 42 during which the fracture area fractures. The retaining ring is aligned with the trunnion 36. A force is then applied to the retaining ring 50 in the direction of the hub 32. The applied force causes the retaining ring to expand as it is forced against the increasing diameter of the trunnion 36 or the fracture tool 70. The fracture area then fractures so that the retaining ring 50 may be displaced in the retaining groove 42. The retaining ring 50 then contracts to be secured within the retaining groove 42.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A constant velocity joint comprising:
   a trunnion defining a retaining groove;
   a retaining ring secured within said retaining groove, said retaining ring including a first leg having an inner surface and a first notch, a second leg having an outer surface and a second notch, and a fracture area extending between said first notch and said second notch, and wherein said first leg extends outwardly from said inner surface and said second leg extends outwardly from said first leg, said second leg being angled relative to said first leg, said second leg defining said outer surface, and wherein said fracture area is fractured as said retaining ring is secured in said retaining groove.

2. The constant velocity joint of claim 1 wherein said first notch is defined by said first leg and said second leg defines said second notch extending inwardly from said outer surface toward said first notch.

* * * * *